United States Patent
Dinan et al.

(10) Patent No.: US 8,068,838 B1
(45) Date of Patent: Nov. 29, 2011

(54) MOBILE COMMUNICATION DEVICE INITIATED HAND-OFF BASED ON AIR INTERFACE METRICS

(75) Inventors: Esmail Hejazi Dinan, Herndon, VA (US); Jong-hak Jung, Herndon, VA (US); Swati Tiwari, Fairfax, VA (US); Hemanth Balaji Pawar, Herndon, VA (US); Krishna D. Sitaram, Chantilly, VA (US)

(73) Assignee: Clear Wireless LLC, Kirkland, WA (US)

( * ) Notice: Subject to any disclaimer, the term of this patent is extended or adjusted under 35 U.S.C. 154(b) by 574 days.

(21) Appl. No.: 12/193,926

(22) Filed: Aug. 19, 2008

(51) Int. Cl.
  *H04W 36/00* (2009.01)
  *H04W 24/00* (2009.01)
  *H04W 4/00* (2009.01)
  *H04M 1/00* (2006.01)
(52) U.S. Cl. ............. 455/436; 455/553.1; 455/552.1; 455/456.6; 370/331; 370/338
(58) Field of Classification Search ........... 455/456.6, 455/436, 552.1, 553.1; 370/310, 338
See application file for complete search history.

(56) References Cited

U.S. PATENT DOCUMENTS

| | | | |
|---|---|---|---|
| 7,295,119 B2 * | 11/2007 | Rappaport et al. | 340/572.4 |
| 2002/0077115 A1 * | 6/2002 | Ruutu et al. | 455/456 |
| 2007/0072614 A1 | 3/2007 | Forsberg | |
| 2007/0177510 A1 | 8/2007 | Natarajan et al. | |
| 2007/0189216 A1 | 8/2007 | Wang et al. | |
| 2007/0258407 A1 | 11/2007 | Li et al. | |
| 2007/0291717 A1 | 12/2007 | Williams et al. | |
| 2008/0085712 A1 | 4/2008 | Han | |

* cited by examiner

*Primary Examiner* — Marivelisse Santiago Cordero
*Assistant Examiner* — Mong-Thuy Tran
(74) *Attorney, Agent, or Firm* — O'Brien Jones, PLLC

(57) ABSTRACT

A mobile communication device wirelessly transfers user communications to a first wireless base station. The mobile communication device determines a first metric based on a load indicator for the first base station. The mobile communication device identifies a second wireless base station and determines a second metric based on a load indicator for the second base station. If the second metric is superior to the first metric, the mobile communication device determines if the second base station has sufficient performance characteristics for communication with the device. If the performance is sufficient, the mobile communication device initiates a hand-off from the first base station to the second base station. The mobile communication device may use additional factors to determine the first and second metrics.

18 Claims, 5 Drawing Sheets

MOBILE COMMUNICATION DEVICE INITIATED HAND-OFF BASED ON AIR INTERFACE METRICS

TECHNICAL BACKGROUND

A mobile communication device and its serving base station wirelessly communicate to provide voice, Internet, email, text, video, and other communication services. As the mobile communication device moves about, the serving base station hands-off the mobile communication device to another target base station. After the hand-off, the target base station then becomes the serving base station, and subsequently, this new serving base station will hand-off the mobile communication device to another target base station.

In some communication systems, the mobile communication device receives a list of nearby base stations from the serving base station. If the mobile communication device detects an unacceptable loss of wireless signal strength for the serving base station, then the mobile communication device selects another base station from the list having the best wireless signal strength to be the target base station. The mobile communication device then initiates a hand-off from the serving base station to the selected target base station.

Serving base stations may also initiate hand-offs when they become overloaded and need to reduce the number of mobile communications devices they serve. Typically, the overloaded base station hands-off the mobile communication devices to more lightly loaded base stations. Serving base stations may also initiate hand-offs based on low wireless signal strength.

Overview

A mobile communication device wirelessly transfers user communications to a first wireless base station. The mobile communication device determines a first metric based on a load indicator for the first base station. The mobile communication device identifies a second wireless base station and determines a second metric based on a load indicator for the second base station. If the second metric is superior to the first metric, the mobile communication device determines if the second base station has sufficient performance characteristics for communication with the device. If the performance is sufficient, the mobile communication device initiates a hand-off from the first base station to the second base station. The mobile communication device may use additional factors to determine the first and second metrics.

DETAILED DESCRIPTION

Figure 1:
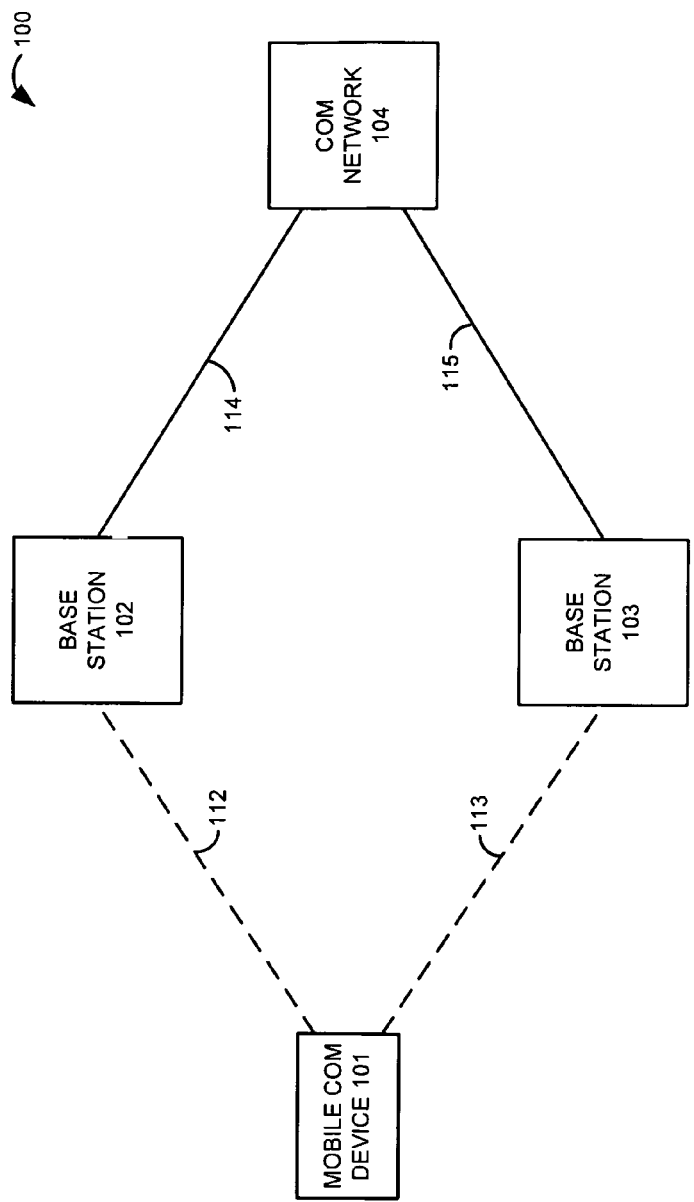
FIG. 1 is a block diagram that illustrates a communication system.

FIG. 1 is a block diagram that illustrates communication system 100. Communication system 100 comprises mobile communication device 101, wireless base stations 102-103, and communication network 104. Mobile communication device 101 and base station 102 communicate over wireless communication link 112. Mobile communication device 101 and base station 103 communicate over wireless communication link 113. Base station 102 and communication network 104 communicate over communication link 114. Base station 103 and communication network 104 communicate over communication link 115.

Mobile communication device 101 comprises a telephone, transceiver, computer, digital assistant, Internet access device, or some other wireless communication apparatus—including combinations thereof. Base stations 102-103 comprise antennas, transceivers, amplifiers, filters, routers, servers or some other communication components—including combinations thereof. Communication network 104 comprises wireless communication nodes, telephony switches, internet routers, network gateways, computer systems, communication links, or some other type of communication equipment—including combinations thereof.

Wireless communication links 112-113 use the air or space as the transport media. Wireless communication links 112-113 may use various protocols, such as wireless fidelity, code division multiple access, global system for mobile communications, worldwide interoperability for microwave access, long term evolution, internet, telephony, or some other communication format—including combinations thereof. Wireless link 112 typically comprises an uplink and a downlink. The uplink transfers wireless communications from device 101 to base station 102, and the downlink transfers wireless communications from base station 102 to device 101. Wireless link 113 typically comprises an uplink and a downlink. The uplink transfers wireless communications from device 101 to base station 103, and the downlink transfers wireless communications from base station 103 to device 101.

Communication links 114-115 use metal, glass, air, or some other material as the transport media. Communication links 114-115 could use various protocols, such as wireless fidelity, code division multiple access, global system for mobile communications worldwide interoperability for microwave access, internet, Ethernet, telephony, time division multiplex, or some other communication format—including combinations thereof. Communication links 114-115 may be direct links or may include various intermediate communication nodes, systems, or networks.

Figure 2:
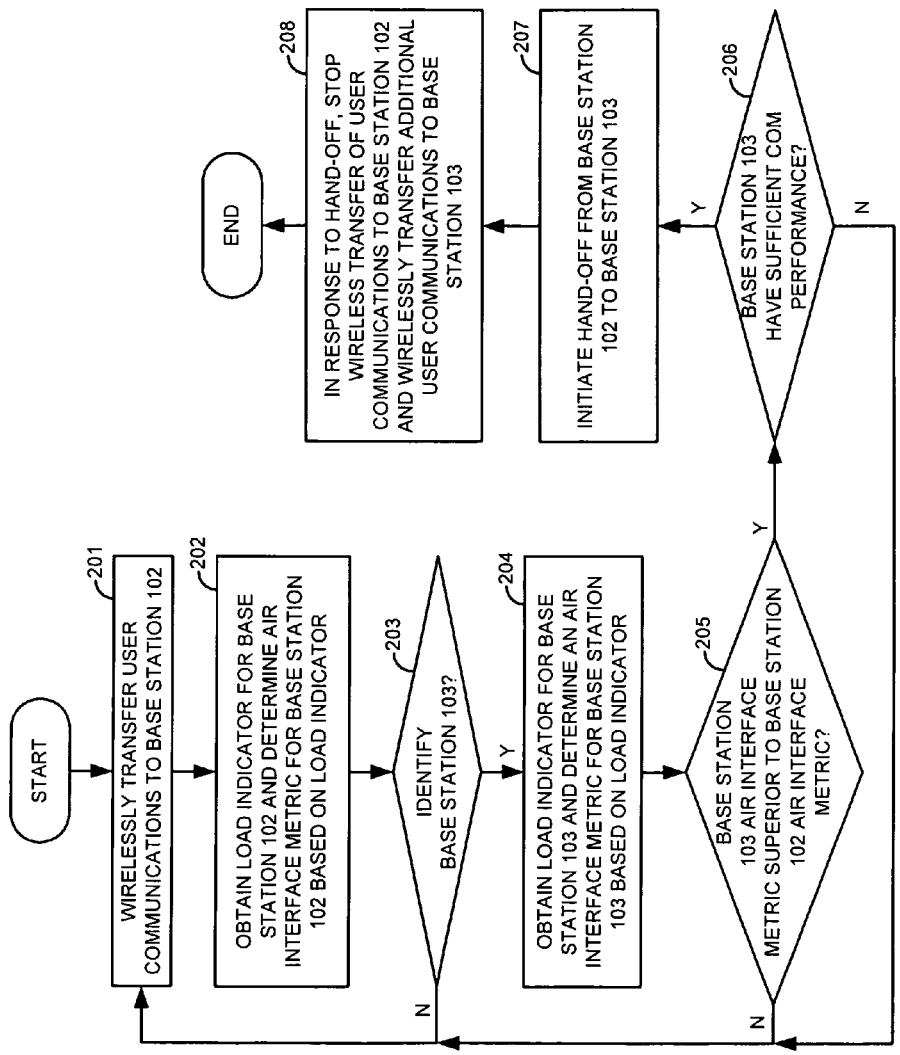
FIG. 2 is a flow diagram that illustrates the operation of a mobile communication device in the communication system.

FIG. 2 is a flow diagram that illustrates the operation of mobile communication device 101 within communication system 100. The operation starts with mobile communication device 101 wirelessly transferring user communications to base station 102 over wireless communication link 112 (201). User communications include voice, video, audio, Internet, or some other type of user information—including combinations thereof. User communications do not include the control information that is exchanged between mobile communication device 101 and communication system 100 to establish the communication paths that transfer the user communications. At this point, mobile communication device 101 does not transfer user communications to base station 103, although some control information may be exchanged between mobile communication device 101 and base station 103.

Mobile communication device 101 obtains a communication load indicator for base station 102 and determines an air interface metric for base station 102 based on the load indicator (202). The load indicator represents the aggregate bandwidth, number of users, processing load, or some other metric that indicates the current amount of communication service being provided to users by base station 102. For example, the load indicator may comprises an uplink load indicator and downlink load indicator for a base station. The uplink load indicator represents the current loading on uplinks to the base station, and the downlink load indicator represents the current loading on downlinks from the base station. Although not required, the load indicator may be an integer, such as a three-bit number between 0-7, that corresponds to the current load level. The load indicator may be added to the control information being broadcast by base station 102. For example, in worldwide interoperability for microwave access, an uplink load indicator could be added to the uplink channel descriptor, and a downlink load indicator could be added to the downlink channel descriptor.

If mobile communication device 101 identifies base station 103 (203), device 101 obtains a communication load indicator for base station 103 and determines a second air interface metric for base station 103 based on the load indicator (204). Mobile communication device 101 identifies base station 103 by: wirelessly receiving a list of base stations from base station 102, scanning for base station pilot signals, translating the location of device 101 into a base station list, or some other technique. Mobile communication device 101 compares the air interface metric for base station 102 to the air interface metric for base station 103 to determine air interface superiority (205). An air interface metric is typically superior if it is numerically higher than the other air interface metric, although based on how the metrics are calculated, superiority may be indicated by a lower number, better grade, or some other comparison technique. If the air interface metric for base station 103 is superior to the air interface metric for base station 102 (205), then mobile communication device 101 determines if base station 103 has sufficient performance characteristics for wireless communication with mobile communication device 101 (206).

Mobile communication device 101 can use various techniques to determine sufficient communication performance for base station 103. Mobile communication device 101 may receive a signal-to-noise indicator and/or a signal strength indicator for link 113 from base station 103. Mobile communication device 101 may perform signal processing on received signals to generate a signal-to-noise indicator and/or a signal strength indicator for link 113. Mobile communication device 101 would then compare the signal-to-noise indicator and/or the signal strength indicator to threshold values that represent sufficient communication performance. The threshold values could be pre-determined, and may be optimized based on the signal-to-noise and signal strength indicators of serving base station 102. Mobile communication device 101 may access a database (internal or external) that translates the current location of device 101 into a determination of sufficient communication performance for base station 103. Other suitable techniques could be used.

If base station 103 has sufficient performance characteristics (206), then mobile communication device 101 initiates a hand-off from the base station 102 to the base station 103 (207). In response to the hand-off, mobile communication device 101 stops the wireless transfer of the user communications to base station 102 and wirelessly transfers additional user communications to base station 103 (208). Mobile communication device 101 can use various techniques to initiate the handoff from base station 102 to base station 103. Mobile communication device 101 could transfer a hand-off request to base station 102. Mobile communication device 101 could transfer a hand-off request to base station 103. Mobile communication device 101 could transfer associated hand-off requests to both base stations 102-103. Mobile communication device 101 could transfer a hand-off request to some other control system. Typically a hand-off timer is used to delay the hand-off for a short period to ensure that the conditions initiating the hand-off are stable and not merely transitory. Other suitable techniques could be used.

Figure 3:
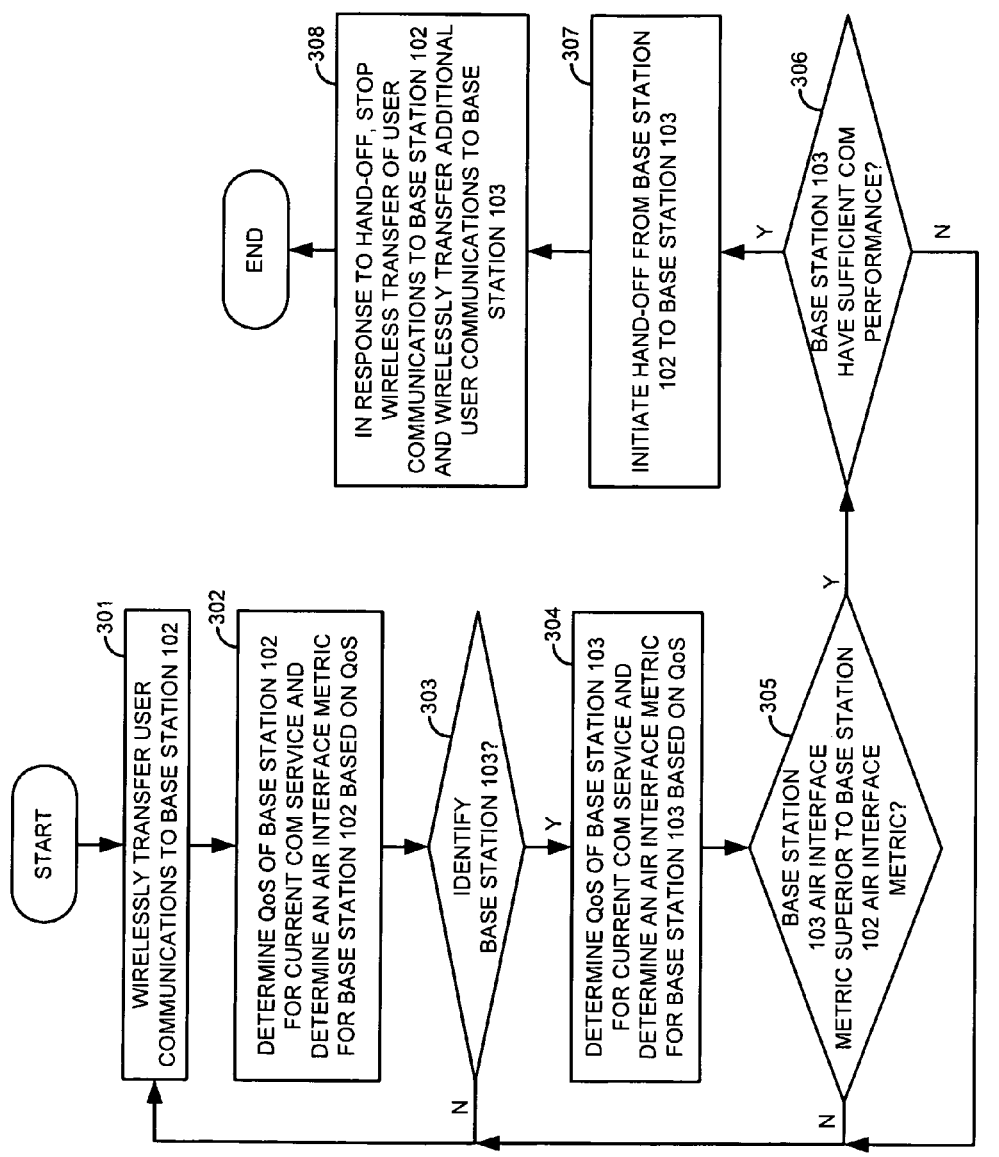
FIG. 3 is a flow diagram that illustrates the operation of a mobile communication device in the communication system.

FIG. 3 is a flow diagram that illustrates the operation of mobile communication device 101 within communication system 100. The operation starts with mobile communication device 101 wirelessly transferring user communications to base station 102 over wireless communication link 112 (301). At this point, mobile communication device 101 does not transfer user communications to base station 103, although some control information may be exchanged between mobile communication device 101 and base station 103. Mobile communication device 101 determines a communication service that it is currently providing and determines the quality-of-service that base station 102 provides for that communication service. Mobile communication device 101 determines an air interface metric for base station 102 based on the quality-of-service that base station 102 has for the communication service (302).

The communication service may be voice telephony, push-to-talk, web browsing, email, text messaging, video download, audio download, or some other service. The quality-of-service may be expressed by a number or some other measurement data. Various techniques can be used to determine the quality-of-service provided by a base station for a specific communication service. The base stations may broadcast their quality-of-service for various communication services. A base station may transfer a base station list that has quality-of-service metrics for various communication services for the base stations on the list. Mobile device 101 may store a database of quality-of-service measures by communication service for various base stations.

If mobile communication device 101 identifies base station 103 (303), device 101 determines the quality-of-service for the communication service provided by base station 103. Mobile communication device 101 determines an air interface metric for base station 103 based on the quality-of-service that base station 103 has for the communication service (304). Mobile communication device 101 compares the air interface metric for base station 102 to the air interface metric for base station 103 to determine superiority (305). If the air interface metric for base station 103 is superior to the air interface metric for base station 102 (305), then mobile communication device 101 determines if base station 103 has sufficient performance characteristics for wireless communication with mobile communication device 101 (306). If base station 103 has sufficient performance characteristics (306), then mobile communication device 101 initiates a hand-off from the base station 102 to the base station 103 (307). In response to the hand-off, mobile communication device 101 stops the wireless transfer of the user communications to base station 102 and wirelessly transfers additional user communications to base station 103 (308).

Figure 4:
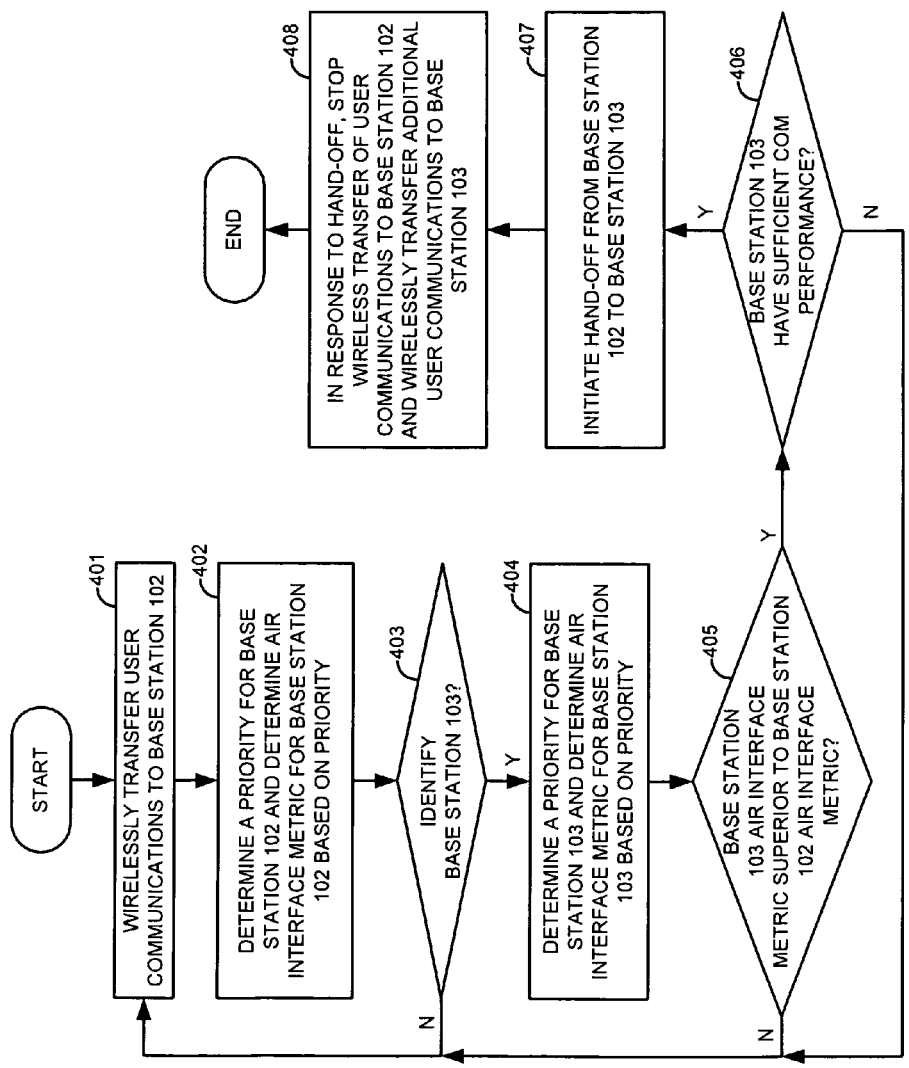
FIG. 4 is a flow diagram that illustrates the operation of a mobile communication device in the communication system.

FIG. 4 is a flow diagram that illustrates the operation of mobile communication device 101 within communication system 100. The operation starts with mobile communication device 101 wirelessly transferring user communications to base station 102 over wireless communication link 112 (401). At this point, mobile communication device 101 does not transfer user communications to base station 103, although some control information may be exchanged between mobile communication device 101 and base station 103. Mobile communication device 101 determines the priority of base station 102. Mobile communication device 101 determines an air interface metric for base station 102 based on the priority of base station 102 (402).

The priority of a base station is set by network engineers to accomplish a goal such as directing users to smaller base stations, historically underutilized base stations, or higher-capability base stations. Mobile communication device 101 can use various techniques to determine the priority of a base station. Mobile communication device 101 may obtain a base station list that is arranged in a prioritized order that indicates the relative priority of the base stations on the list. Such an arrangement might assign different priorities to different groups of base stations. Mobile communication device 101 may process a base station identifier, where identifier encodes the priority of that base station. An example of a base station identifier is a preamble code, although other identifiers could be used. Mobile communication device 101 may access a database (internal or external) that translates a base station identifier into a priority level for that base station. Other suitable techniques could be used.

If mobile communication device 101 identifies base station 103 (303), device 101 determines the priority of base station 103. Mobile communication device 101 determines an air interface metric for base station 103 based on the priority of base station 103 (404). Mobile communication device 101 compares the air interface metric for base station 102 to the air interface metric for base station 103 to determine superiority (405). If the air interface metric for base station 103 is superior to the air interface metric for base station 102 (405), then mobile communication device 101 determines if base station 103 has sufficient performance characteristics for wireless communication with mobile communication device 101 (406). If base station 103 has sufficient performance characteristics (406), then mobile communication device 101 initiates a hand-off from the base station 102 to the base station 103 (407). In response to the hand-off, mobile communication device 101 stops the wireless transfer of the user communications to base station 102 and wirelessly transfers additional user communications to base station 103 (408).

Figure 5:
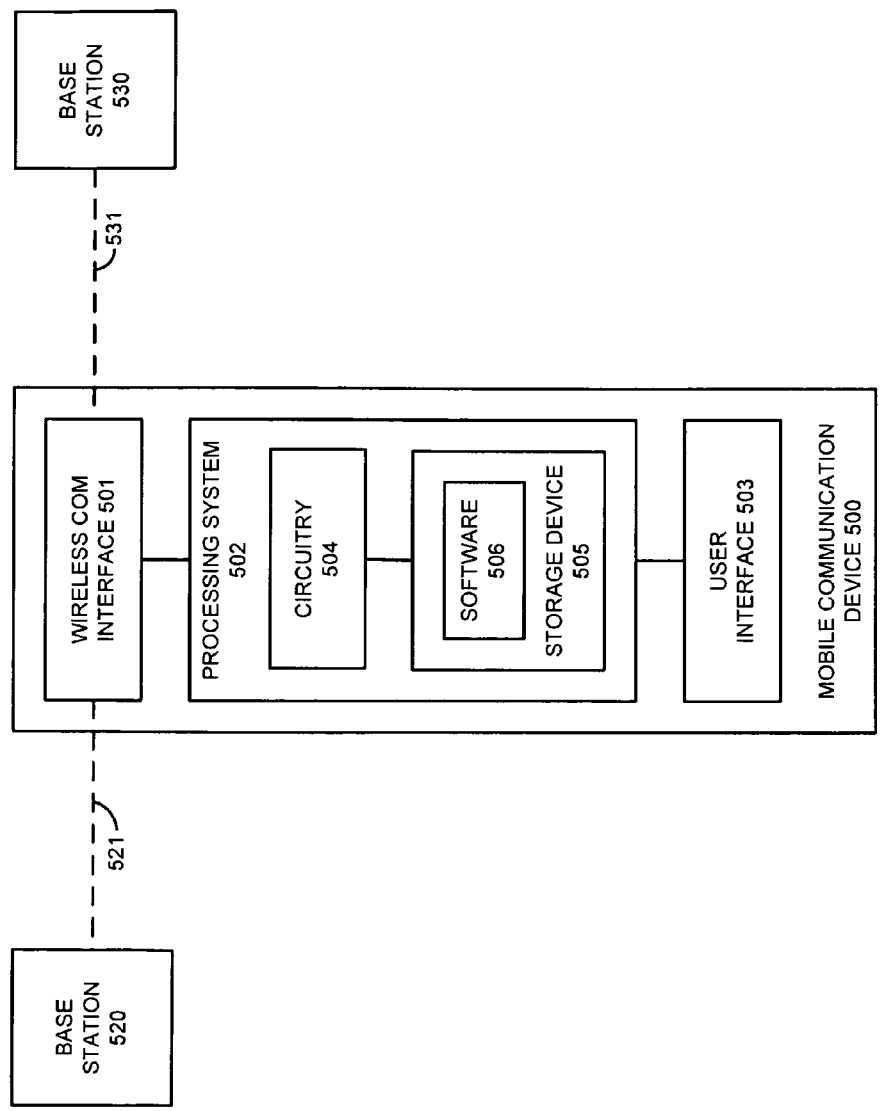
FIG. 5 is a block diagram that illustrates a mobile communication device.

FIG. 5 is a block diagram that illustrates mobile communication device 500. Mobile communication device 500 provides on example of communication device 101, although device 101 may use other configurations. Mobile communication device 500 may include other components (such as a battery or a camera) that are not shown for clarity. Mobile communication device 500 comprises wireless communication interface 501, processing system 502, and user interface 503. Processing system 502 is linked to wireless communication interface 501 and user interface 503. Processing system 502 includes circuitry 504 and storage device 505 that stores operating software 506.

Wireless communication interface 501 comprises components that transmit and receive wireless signals under the control of processing system 502. These components include an RF transceiver and antenna along with signal processing circuitry. Wireless communication interface 501 processes received wireless signals to generate signal-to-noise ratios and signal strength indicators for the wireless signals. Wireless communication interface 501 wirelessly transfers a time stamped signal that is returned by the receiving base station and processes the returned signal to determine round trip delay. Although mobile communication device 500 may communicate with various base stations, wireless communication interface 301 is shown in communication with base station 520 over wireless link 521 and with base station 530 over wireless link 531. Wireless communication interface 501 typically identifies base stations by scanning frequency bands as directed by processing system 502.

User interface 503 comprises components that interact with the user under the control of processing system 502. These components may include a speaker, microphone, buttons, lights, display screen, touch screen, touch pad, scroll wheel, or some other user input/output apparatus.

Circuitry 504 comprises microprocessor and associated circuitry that retrieves and executes operating software 506 from storage device 505 to control wireless communication interface 501 and user interface 503. Storage device 505 comprises a disk drive, flash drive, memory circuitry, or some other memory device. Operating software 506 comprises computer programs, firmware, or some other form of machine-readable processing instructions. Operating software 506 may include an operating system, utilities, drivers, network interfaces, applications, or some other type of software. When executed by circuitry 504, operating software 506 directs processing system 502 to operate wireless communication device 500 like the operation of wireless communication device 101. In particular, operating software 506 directs processing system 502 to identify base stations, calculate air interface metrics, verify sufficient communication performance for base stations with superior air interface metrics, and initiate hand-offs to base stations with sufficient communication performance and superior air interface metrics.

FIGS. 2-4 illustrate various techniques for a wireless communication device to initiate a hand-off from one base station to another based on comparative air interface metrics. These techniques could be combined to determine an air interface metric. For example, the base station loading, quality-of-service, and priority could each be translated into a corresponding numerical value. These numerical values could then be weighted and summed to obtain an air interface metric that is based on base station loading, quality-of-service, and priority. In addition, the round trip delay, signal strength, and signal-to-noise ratio could also be translated into numerical values that are weighted and summed to determine the air interface metric for the base station. Various sub-combinations of these items could be translated into numerical values, weighted, and summed to determine the air interface metric.

For example, mobile communication device 101 could use the following equation to determine the air interface metric for a base station:

$$\text{Air Interface Metric} = (C1 \times L) + (C2 \times RTD) + (C3 \times SS) + (C4 \times SNR) + (C5 \times QoS) + (C6 \times P); \text{ where}$$

L=the communication loading of the base station,
RTD=round trip delay for a signal to and from the base station,
SS=signal strength for a signal from the base station,
SNR=signal–to-noise ratio for a signal from the base station,
QoS=quality-of-service of the base station for the current communication service being provided by the mobile communication device,
P=network priority of the base station, and
C1, C2, C3, C4, C5, and C6=coefficients that are optimized to maximize network performance.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a mobile communication device comprising:

transferring, by the mobile communication device, user communications to a first wireless base station through a wireless communication link;

obtaining, by the mobile communication device, a first communication load indicator for the first base station and determining, by the mobile communication device, a first air interface metric for the first base station based on the first communication load indicator;

identifying a second wireless base station, obtaining, by the mobile communication device, a second communication load indicator for the second base station, and determining, by the mobile communication device, a second air interface metric for the second base station based on the second communication load indicator;

comparing the first air interface metric to the second air interface metric;

determining whether the second wireless base station has sufficient performance characteristics for wireless communication with the mobile communication device, when the second air interface metric is superior to the first air interface metric; and initiating a hand-off from the first wireless base station to the second wireless base station, stopping the wireless transfer of the user communications to the first wireless base station, and wirelessly transferring additional user communications to the second wireless base station, when the second air interface metric is superior to the first air interface metric and the second wireless base station has the sufficient performance characteristics, wherein obtaining the first communication load indicator for the first base station comprises wirelessly receiving a first base station uplink load indicator and a first base station downlink load indicator, and determining the first air interface metric based on the first communication load comprises processing the first base station uplink load indicator and the first base station downlink load indicator; and obtaining the second communication load indicator for the second base station comprises wirelessly receiving a second base station uplink load indicator and a second base station downlink load indicator, and determining the second air interface metric based on second communication load comprises processing the second base station uplink load indicator and the second base station downlink load indicator.

2. The method of claim 1 wherein:

determining the first air interface metric further comprises determining the first base station's signal strength and determining the first air interface metric based on the first base station's signal strength; and determining the second air interface metric further comprises determining the second base station's signal strength and determining the second air interface metric based on the second base station's signal strength.

3. The method of claim 2 wherein:

determining the first air interface metric further comprises determining the first base station's signal-to-noise ratio and determining the first air interface metric based on the first base station's signal-to-noise ratio; and determining the second air interface metric further comprises determining the second base station's signal-to-noise ratio and determining the second air interface metric based on the second base station's signal-to-noise ratio.

4. The method of claim 3 wherein:

determining the first air interface metric further comprises determining the first base station's round trip delay and determining the first air interface metric based on the first base station's round trip delay; and determining the second air interface metric further comprises determining the second base station's round trip delay and determining the second air interface metric based on the second base station's round trip delay.

5. The method of claim 4 wherein:

determining the first air interface metric further comprises determining a communication service being provided by the mobile communication device, determining the first base station's quality-of-service for a communication service, and determining the first air interface metric based on the first base station's quality-of-service for the communication service; and determining the second air interface metric further comprises determining the second base station's quality-of-service for the communication service and determining the second air interface metric based on the second base station's quality-of-service for the communication service.

6. The method of claim 5 wherein:

determining the first air interface metric further comprises determining the first air interface metric based on the first base station's current base station priority; and determining the second air interface metric comprises determining the second air interface metric based on the second base station's current base station priority.

7. The method of claim 1 wherein identifying the second wireless base station comprises wirelessly receiving a base station list.

8. The method of claim 1 wherein determining whether the second wireless base station has the sufficient performance characteristics for the mobile communication device comprises, in response to determining that the second air interface metric is superior to the first air interface metric, wirelessly receiving a signal from the second wireless base station, obtaining a signal-to-noise ratio for the second wireless base station based on the received signal, and comparing the signal-to-noise ratio to a threshold.

9. The method of claim 1 wherein determining whether the second wireless base station has the sufficient performance characteristics for the mobile communication device comprises, in response to determining that the second air interface metric is superior to the first air interface metric, wirelessly receiving a signal from the second wireless base station, obtaining a signal strength indicator for the second wireless base station based on the received signal, and comparing the signal strength indicator to a threshold.

10. A mobile communication device comprising:

a wireless communication interface configured to transfer user communications to a first wireless base station through a first wireless communication link and to transfer additional user communications to a second wireless base station through a second wireless communication link; and a processing system configured to:

determine a first air interface metric for the first base station based on the first base station's current communication load;

determine a second air interface metric for the second base station based on the second base station's current communication load and determine if the second wireless base station has sufficient performance characteristics for wireless communication with the mobile communication device; and initiate a hand-off from the first wireless base station to the second wireless base station and direct the wireless communication interface to stop the wireless transfer of the user communications to the first wireless base station and to start the wireless transfer of the additional user communications to the second wireless base station, when the second wireless base station has the sufficient performance characteristics and if the second air interface metric is superior to the first air interface metric, wherein to determine the first air interface metric based on the first base station's current communication load comprises processing a first base station uplink load indicator and a first base station downlink load indicator, and to determine the second air interface metric based on the second base station's current communication load comprises processing a second base station uplink load indicator and a second base station downlink load indicator.

11. The mobile communication device of claim 10 wherein the processing system is further configured to determine the first air interface metric based on the first base station's current signal strength and to determine the second air interface metric based on the second base station's current signal strength.

12. The mobile communication device of claim 11 wherein the processing system is further configured to determine the first air interface metric based on the first base station's current signal-to-noise ratio and to determine the second air interface metric based on the second base station's current signal-to-noise ratio.

13. The mobile communication device of claim 12 wherein the processing system is further configured to determine the first air interface metric by based on the first base station's current round trip delay and to determine the second air interface metric based on the second base station's current round trip delay.

14. The mobile communication device of claim 13 wherein the processing system is further configured to determine the first air interface metric based on the first base station's current quality-of-service for a current communication service being provided by the mobile communication device and to determine the second air interface metric based on the second base station's current quality-of-service for the current communication service being provided by the mobile communication device.

15. The mobile communication device of claim 14 wherein the processing system is further configured to determine the first air interface metric based on the first base station's current base station priority and to determine the second air interface metric based on the second base station's current base station priority.

16. The mobile communication device of claim 10 wherein:
the wireless communication interface is further configured to wirelessly receive a base station list identifying the second base station; and
the processing system is further configured to determine the second air interface metric in response to identifying the second base station on the base station list.

17. The mobile communication device of claim 10 wherein:
the processing system is further configured, in response to determining that the second air interface metric is superior to the first air interface metric, to direct the wireless communication interface to wirelessly receive a signal from the second wireless base station and obtain a signal-to-noise ratio for the second wireless base station based on the received signal;
the wireless communication interface is further configured to wirelessly receive the signal from the second wireless base station and obtain the signal-to-noise ratio for the second wireless base station based on the received signal; and
the processing system is further configured to compare the signal-to-noise ratio to a threshold.

18. The mobile communication device of claim 10 wherein:
the processing system is further configured, in response to determining that the second air interface metric is superior to the first air interface metric, to direct the wireless communication interface to wirelessly receive a signal from the second wireless base station and obtain a signal strength indicator for the second wireless base station based on the received signal;
the wireless communication interface is further configured to wirelessly receive the signal from the second wireless base station and obtain the signal strength indicator for the second wireless base station based on the received signal; and
the processing system is further configured to compare the signal strength indicator to a threshold.

* * * * *